United States Patent
Chung Kam Chung et al.

(10) Patent No.: US 6,606,502 B1
(45) Date of Patent: Aug. 12, 2003

(54) METHOD SYSTEM AND MOBILE SWITCHING CENTER (MSC) FOR REPORTING CAPABILITY TO PERFORM PERIODIC BROADCAST SHORT MESSAGE SERVICE (SMS)

(75) Inventors: Georges Chung Kam Chung, Candiac (CA); Walter Cigana, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/512,367

(22) Filed: Feb. 25, 2000

Related U.S. Application Data

(60) Provisional application No. 60/145,791, filed on Jul. 27, 1999.

(51) Int. Cl.⁷ .................................................. H04Q 7/20
(52) U.S. Cl. .................. 455/466; 455/414.1; 455/422.1
(58) Field of Search ................................ 455/466, 412, 455/414, 422; 370/349, 429

(56) References Cited

U.S. PATENT DOCUMENTS

| | | | | |
|---|---|---|---|---|
| 5,878,033 A | * | 3/1999 | Mouly ......................... | 370/312 |
| 5,878,351 A | * | 3/1999 | Alanara et al. ............ | 340/7.21 |
| 5,920,822 A | * | 7/1999 | Houde et al. ............... | 340/7.27 |
| 6,108,325 A | * | 8/2000 | Stephanson et al. ........ | 370/337 |
| 6,263,212 B1 | * | 7/2001 | Ross et al. .................. | 370/428 |
| 6,449,488 B1 | * | 9/2002 | Cheng et al. ................ | 340/7.3 |

FOREIGN PATENT DOCUMENTS

| | | |
|---|---|---|
| EP | 0936825 A2 | 9/1999 |
| GB | 2301732 A | 12/1996 |
| GB | 2327571 A | 1/1999 |
| WO | WO9610895 | 4/1996 |
| WO | WO9729603 | 8/1997 |

* cited by examiner

Primary Examiner—Thanh Cong Le
Assistant Examiner—Tsuleun R Lei
(74) Attorney, Agent, or Firm—Jenkens & Gilchrist; Sandra Beauchesne

(57) ABSTRACT

In a cellular telecommunications network, a method and system allowing a Message Center (MC) to receive an indication of the periodic broadcast SMS capability of co-operating Mobile Switching Centers (MSCs) when a periodic broadcast SMS is initiated. According to the invention, when a periodic broadcast SMS request is sent from an MC to one MSC for broadcast to the Mobile Stations (MSs), the MSC detects its own capability to handle the periodic broadcast SMS request. Therefore, an indication of the MSC's capability is sent back to the MC. If the MSC accepts to handle the periodic broadcast SMS request on its own, the MSC records the message and periodically broadcasts it to the destination MSs. If not, the MC periodically sends a regular broadcast SMS request along with an instruction for delivery to the MSC, which in turn forwards the SMS body message to the destination MSs.

22 Claims, 6 Drawing Sheets

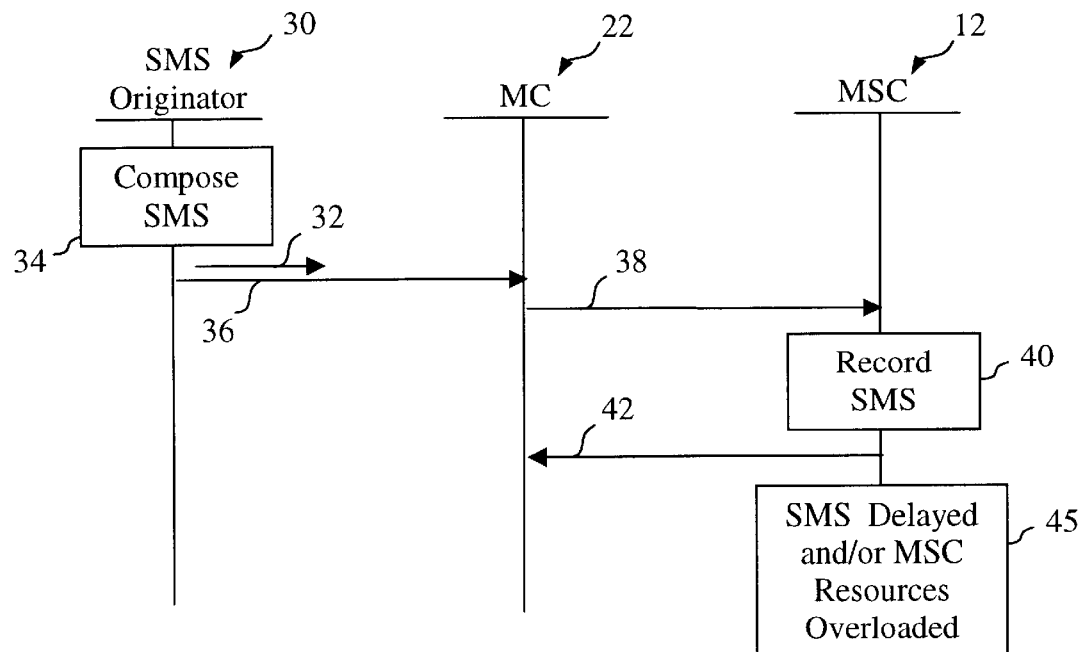
Figure 2.a (Prior Art)
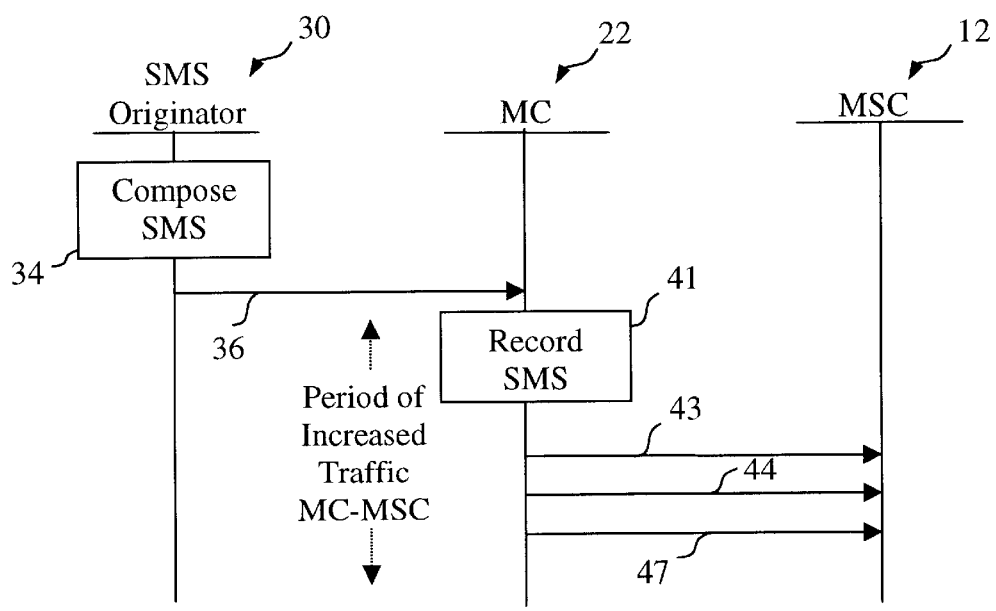
Figure 2.b (Prior Art)

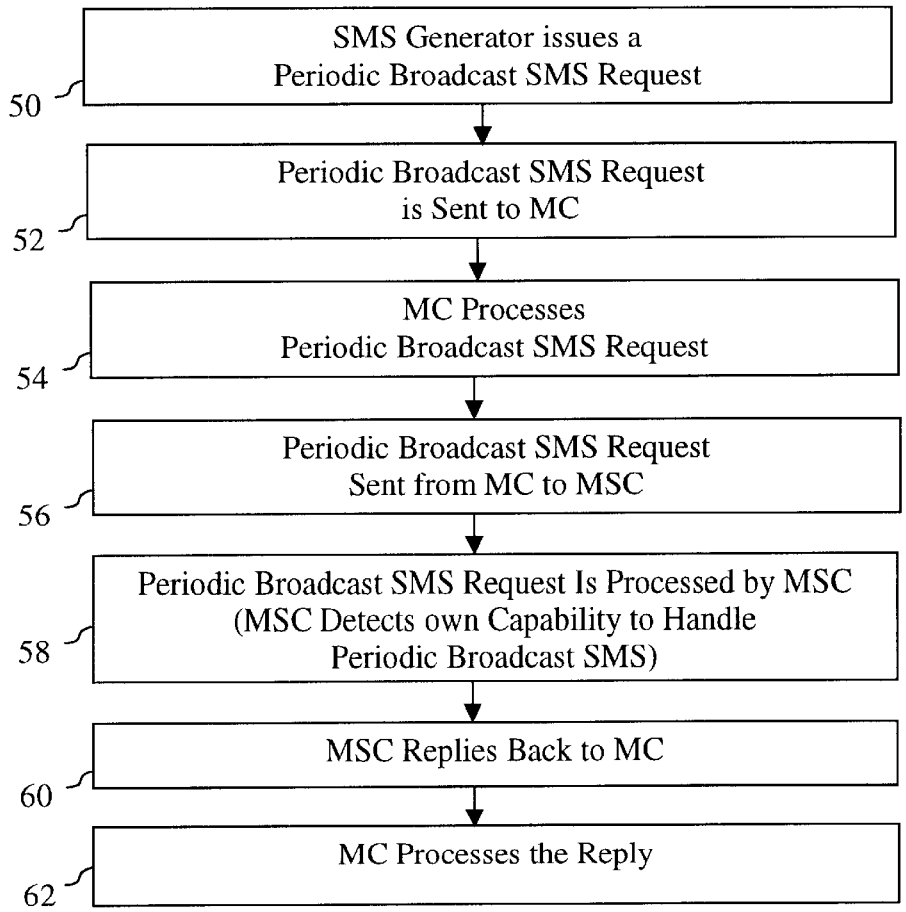
Figure 3.a
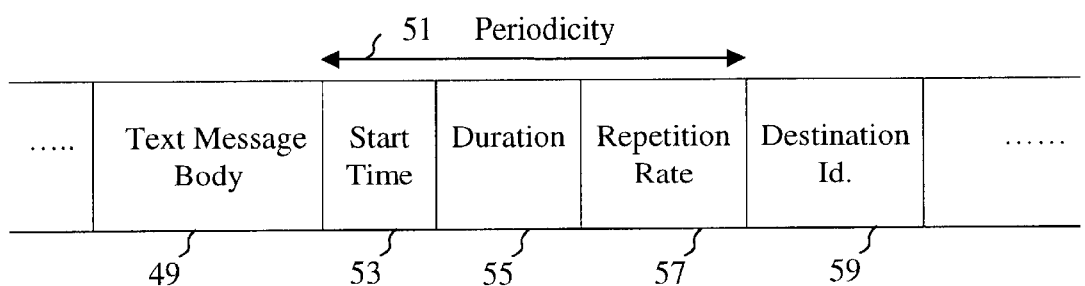
Figure 3.b

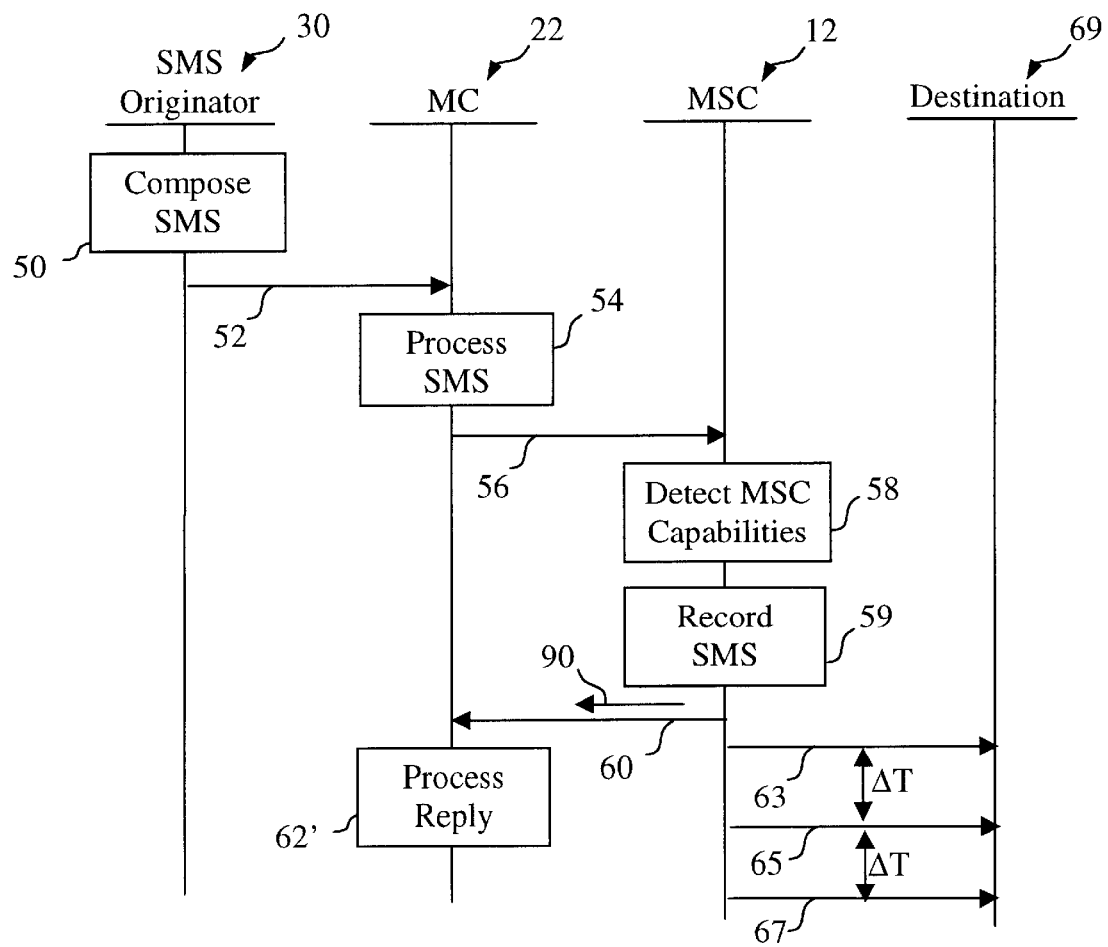
Figure 4.a
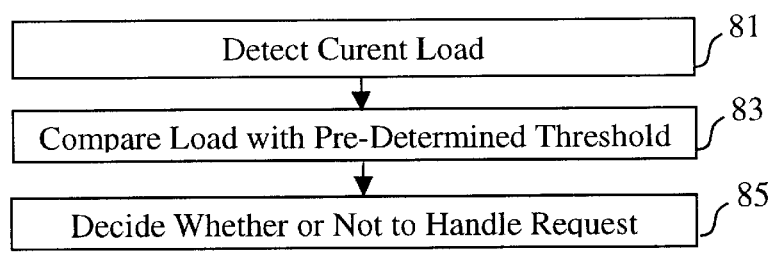
Figure 4.b

METHOD SYSTEM AND MOBILE SWITCHING CENTER (MSC) FOR REPORTING CAPABILITY TO PERFORM PERIODIC BROADCAST SHORT MESSAGE SERVICE (SMS)

PRIORITY STATEMENT UNDER 35 U.S.C S.119 (e) & 37 C.F.R. S.1.78

This nonprovisional patent application claims priority based upon the prior U.S provisional patent application entitled "Mobile Switching Center Capability Reporting for Broadcast Short Message Service (SMS) Requests", application Ser. No. 60/145,791, filed Jul. 27, 1999, in the names of GEORGES CHUNG KAM CHUNG, and WALTER CIGANA.

BACKGROUND OF THE INVENTION

1. Field of the Invention

The present invention relates to cellular telecommunications, particularly to a method, a system, and a corresponding Mobile Switching Center (MSC) for reporting to a Message Center (MC) the periodic broadcast SMS capability of the MSC.

2. Description of the Related Art

In the history of telecommunications networks, the cellular telecommunications networks are one of the most recent. Cellular or wireless telecommunications networks allow subscribers to carry out various types of wireless communications independently of their actual location. At the present time, cellular telecommunications networks support various types of communications such as voice communications, data communications (fax, modem), and text communications (email and Short Message Service, SMS). In this last category, the subscribers can send text emails and SMS messages to each other directly from their Mobile Station (MS) or from a dedicated terminal, such as an internet-connected PC. Text communications over the cellular telecommunications network only require a limited amount of transmission capacity. Therefore, particularly SMS communications are considered a suitable means for broadcasting commercial text messages to a community of subscribers, defined either as a group of subscribers set up according to some pre-arranged relation between the subscribers, or as a geographically-related group of subscribers. Broadcasting text communications may be extensively used for advertising by commercial companies for sending text advertisements to a community of cellular subscribers. In such cases, commercial companies want the commercial message to reach as many subscribers as possible, and one way of insuring maximum distribution is to repeat the broadcast of the message a number of times. In this manner, subscribers who were not available to receive the first message at a first moment (because the MS was powered down, they were out of the coverage area, etc), could be reached by a subsequent distribution of the same commercial message.

In such a scenario, first, the periodic broadcast SMS message is typically created by a message originator and fed into a Message Center (MC), which is a dedicated node in the cellular telecommunications networks that manages and distributes all SMS messages. Initiating a periodic broadcast SMS message typically requires the creation of a message body of limited length, a destination identification (such as a subscriber group identification or an identification of a geographical area of broadcast that may include MSCs identification or sectors thereof), a start time at which the first broadcast is to be performed, a broadcast duration and a repetition rate of the broadcast SMS message. The SMS message is then sent to one or more MSCs corresponding to the broadcast area. In the case of geographical distribution, the MC sends the periodic broadcast SMS to MSCs within the geographical broadcast area. In the case of distribution to a subscriber group, the MC typically sends the periodic broadcast SMS to all MSCs within the service area, and the message is received by all MSs. However, only the intended destination subscribers' MSs (such as for example the MSs of the particular group of subscribers) are able to decipher and display the SMS message.

In current ANSI-41 cellular telecommunications networks, it is proposed to have either all MSCs within a given service area to handle the periodic broadcast SMS messages on their own (the periodic broadcast SMS is received once from the MC to the MSC, and the MSC handles the periodic distribution of the message to destination, hereinafter called "first scenario for periodic broadcasting SMS" or "first scenario"), or to have the MC of the given service area to handle all such messages (the MC periodically sends a request for regular broadcast SMS to the MSCs which simply forwards upon receipt the message body to destination, hereinafter called "the second scenario for periodic broadcasting SMS" or "second scenario"). In the future, it is believed that more and more MSCs will have the feature of handling the periodic broadcast SMS messages on their own, and therefore, the first scenario would become predominant, i.e. cellular telephone operators will set-up network configurations supporting only the first scenario.

However, both proposed implementations contain several drawbacks. In the first scenario, wherein the MSCs record the message and carries the periodic broadcast SMS on their own, it is believed that in some circumstances the MSCs are still not able to perform reliable delivery of the SMS messages. For example, certain MSCs have no capability to directly handle the periodic broadcast SMS during particular periods of time, such as for example because they are too overloaded with handling regular traffic to be able to assume this extra work immediately. This situation may lead to certain limitations in the distribution of periodic broadcast SMSs. In some instances, if the MSC's resources are already in use at a maximum extent, the broadcast request may be unduly delayed. Furthermore, especially if the requested repetition rate of the periodic broadcast SMS is high (the repetition interval is short), accepting to deliver a periodic broadcast SMS may lead to an excessive overload situation for the MSC's resources and have a negative impact on handling regular calls.

In the second scenario, wherein the MC handles the periodic broadcast SMS, the MC keeps all periodic broadcast SMSs in its memory until the repetition duration expires, and handles all such broadcasts on its own by periodically sending regular broadcast SMS messages to the MSC for further distribution to the MS subscribers (the MSC receives a regular broadcast SMS request rather than a periodic broadcast request as in the first scenario and only forwards the message body to the subscribers' MSs upon receipt of the request). This is not optimal, since this scenario will quickly lead to an overload of the MC's resources and especially to increased traffic between the MC and the MSC (the broadcast SMS message must be sent a number of times from the MC to the MSC, instead of being sent only once).

It would be advantageous to have an interaction mechanism allowing the MC and its co-operating MSCs to communicate to each other to determine who will handle a particular periodic broadcast SMS.

In particular, there is an advantage to have an MSC notifying the MC, upon receipt of one particular request for a periodic broadcast SMS, whether or not the MSC will handle the periodic broadcast on its own (the MSC will periodically broadcast the SMS to the destination subscribers without MC's collaboration), or if it will require assistance from the MC (the MC will send the SMS periodically to the MSC, and the MSC will forward the SMS to the destination subscribers).

SUMMARY OF THE INVENTION

It is therefore an object of the present invention to provide a mechanism allowing the MSC to notify the MC whether or not it will handle a periodic broadcast SMS on its own, upon receipt of a periodic broadcast SMS request from the MC.

It is another object of the present invention to provide a method for delivering a periodic broadcast SMS request from an MC to a plurality of MSCs, and to receive back at the MC an indication of the individual capability of each MSC to handle the request on its own, i.e. to periodically deliver the SMS message to MSs according to the request without further cooperation of the MC.

It is yet another object of the invention to provide an MSC capable of detecting and informing its co-operating MC whether or not it will handle a periodic broadcast SMS request on its own, upon receipt of such request from the MC, based on a current level of utilized resources of the MSC.

In accord with the objects of the invention, and as a foremost improvement over the prior art first scenario, there is provided a method for periodic broadcast Short Message Service (SMS) comprising the steps of:

sending a request for a periodic broadcast SMS message from a Message Center (MC) to at least one Mobile Switching Center (MSC);

upon receipt of said request by said MSC, detecting a capability of said MSC to handle periodic broadcast SMS messages; and returning, from said MSC to said MC, an indication of said capability of said MSC to handle periodic broadcast SMS messages.

In accordance with the objects of the present invention, there is further provided, in an ANSI-41 cellular telecommunications network, a method for periodically broadcasting Short Message Service (SMS) messages comprising the steps of:

sending a request for periodic broadcast Short Message service (SMS) through a Short Message Delivery Point-to-Point (SMDPP) message from an SMS originator to a Message Center (MC) for requesting a periodic broadcast SMS, said SMDPP message comprising:

a message body to be broadcast to a plurality of MSs;
a periodicity parameter comprising a start time, a duration and a repetition rate of said periodic broadcast SMS message; and
a destination identifier comprising at least one of i) a geographical zone identifier designating a zone over which the message is to be broadcast and ii) a subscribers' group identifier designating a group of subscribers' MSs intended to receive said SMS message;

sending said SMDPP message from said MC to at least one Mobile Switching Center (MSC) covering at least a portion of said zone; and returning, from said at least one MSC to said MC, an smdpp acknowledgement message comprising an indication of an individual capability of said at least one MSC to handle on its own the periodic broadcast SMS;

wherein if said MSC is capable of handling said periodic broadcast SMS, said indication is an empty smdpp acknowledgement message, while if said MSC is not capable of handling the periodic SMS broadcast, the indication is comprised in one parameter of said smdpp acknowledgement message.

According to yet another object of the invention, there is also provided a cellular telecommunications network comprising:

a Message Center (MC) sending a request for a periodic broadcast Short Message Service (SMS) message; and
at least one Mobile Switching Center (MSC) linked to said MC, receiving said request from said MC;
wherein upon receipt of said request, said MSC detects its capability of handling periodic broadcast SMS messages on its own and replies back to the MC with an indication of said capability.

There is another object of the invention to provide in a cellular telecommunications network, a Mobile Switching Center (MSC) receiving a request for a periodic broadcast Short Message Service (SMS) through a Short Message Service Delivery Point-to-Point (SMDPP) message from a Message Center (MC), wherein upon receipt of said request the MSC detects its capability of handling said request based on a current load on its processing resources, and replies back to the MC with an smdpp acknowledgement message comprising an indication of its capability of handling said request on its own.

According to yet another object of the invention, there is provided a Mobile Switching Center (MSC) comprising:

a resources meter for collecting at least one parameter representative of a level of utilized resources of said MSC; and
a periodic broadcast SMS capability detector for receiving said at least one parameter from said resources meter and for comparing said parameter with a pre-defined threshold of utilized resources;
wherein said detector issues a decision based on a result of the comparison, the decision stating whether or not said MSC is to handle a periodic broadcast SMS request on its own.

Additional objects and advantages of the invention will become apparent to those skilled in the art upon reference to the forthcoming detailed description.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 2.a is a nodal operation and signal flow diagram illustrating a prior art limitation when transmitting a periodic broadcast SMS request;

FIG. 2.b is another nodal operation and signal flow diagram illustrating an additional prior art limitation when transmitting a periodic broadcast SMS request;

FIG. 3.a is a high-level flowchart of an exemplary preferred embodiment of the invention;

FIG. 3.*b* is a simplified exemplary illustration of a periodic broadcast SMS request message;

FIG. 4.*a* is a nodal operation and signal flow diagram illustrating an exemplary preferred embodiment of the invention;

FIG. 4.*b* is a high-level flowchart of another exemplary preferred embodiment of the invention;

DETAILED DESCRIPTION OF THE PREFERRED EMBODIMENTS

Figure 1:
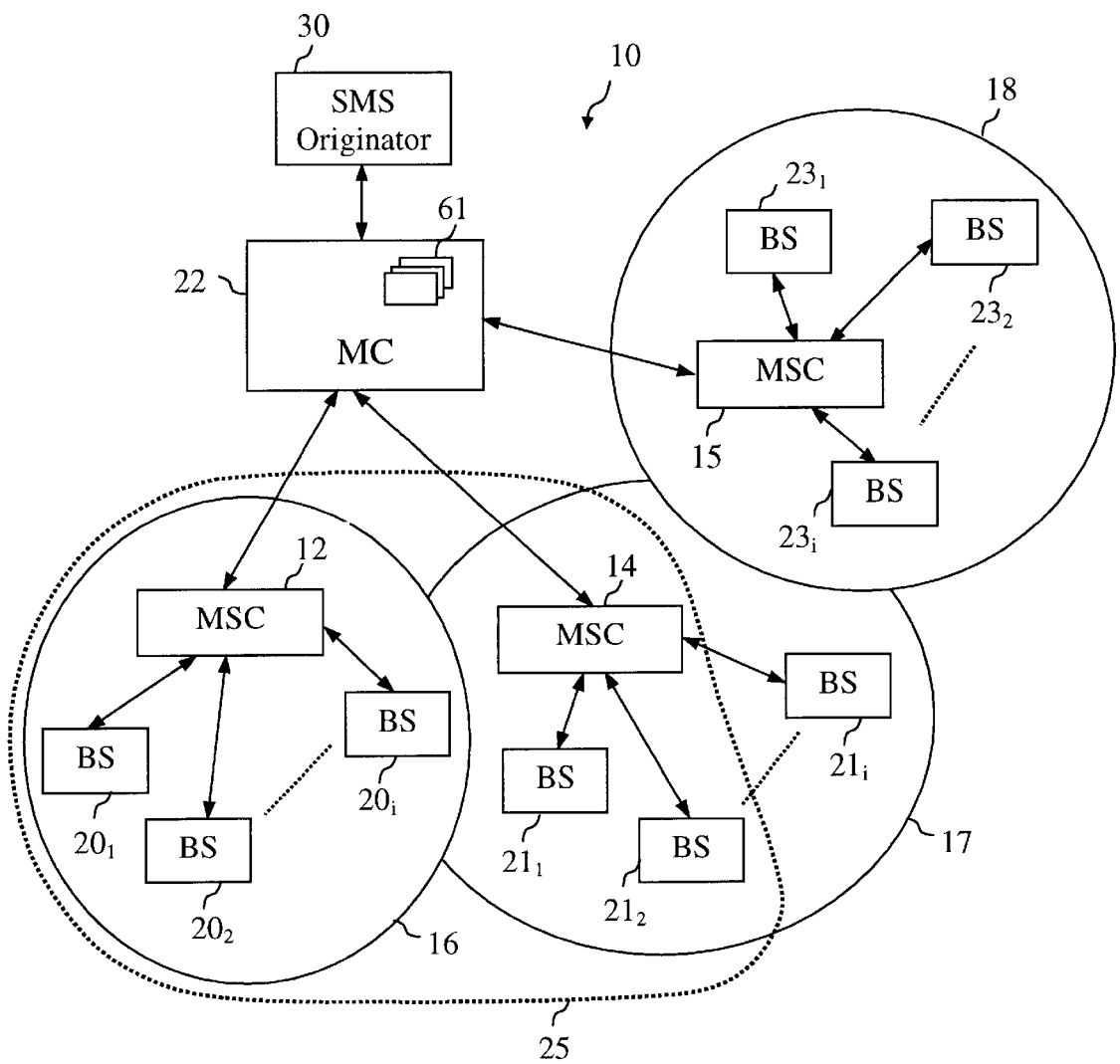
FIG. 1 is a top level block diagram of a cellular telecommunications network according to the typical prior art implementation for managing SMS messages.

Reference is now made to FIG. 1, wherein there is shown a top level block diagram of a cellular telecommunications network 10 as known in the prior art. Such a cellular network comprises a number of MSCs 12, 14, and 15 (only three are shown), each MSC having an associated service area 16, 17, and 18 covered by a number of co-operating Base Stations $20_1$, $21_1$, and $23_1$ (BSs) defining cells (not shown). The BSs $20_1$, $21_1$, and $23_1$ are linked to their respective MSCs 12, 14, or 15 and are responsible for the radio communication with the subscribers' MSs (not shown). The MC 22 is the network entity responsible for handling and managing SMS messages in the cellular telecommunications network 10, and is connected to a number of MSCs, such as to the MSCs 12, 14 and 15. In current implementations, there is typically a relation of one MC for a plurality of MSCs in each cellular telecommunications network operated by one cellular operator (cellular service provider).

Reference is now made to FIGS. 2.*a* and 2.*b*, in which there are shown two typical scenarios for handling a periodic broadcast SMS according to the teaching of the prior art. FIG. 2*a* is a nodal operation and signal flow diagram showing an exemplary scenario (analogue to the first scenario) of a limitation of the prior art technique for handling a periodic broadcast SMS request. First, an SMS originator 30 composes a periodic broadcast SMS message 32, action 34, by entering a number of required parameters comprising a message text body, a destination of the message, a start time (typically including the start date), a duration and a repetition rate of the SMS message, i.e. how often the message should be broadcast to destination. In action 36, a periodic broadcast SMS request is sent from the SMS Originator 30 to the MC 22 corresponding to the broadcast destination zone. Those skilled in the art will readily notice that the SMS Originator 30 may be as well co-located with the MC 22. For example, an SMS administrator may directly feed the periodic broadcast SMS to the MC 22. Once the periodic broadcast SMS request is received at the MC 22, it is processed and the MC 22 determines to which MSCs (or sectors thereof) it is addressed according to the broadcast zone identifier comprised in the message. A representation of an exemplary broadcast zone 25 is shown in dotted lines in FIG. 1, and may comprise one or more MSC's service areas, or portions thereof. For example, in FIG. 1, the broadcast zone identifier defined in the periodic broadcast SMS request designates a zone composed of the service area of the MSC 12, and the two cells served by BS $21_1$ and BS $21_2$ of the service area 17 of the MSC 14.

Reference is now made back to FIG. 2.*a*. The MC 22 then sends the periodic broadcast SMS request to the appropriate MSCs, such as for example to the MSC 12 (only one MSC is shown), action 38. Assuming the case of the first scenario wherein the MSC is to perform the periodic broadcast SMS on its own, upon receipt of the periodic broadcast SMS message the MSC 12 records the message, action 40, and replies back to the MC 22 with a receipt acknowledgement message, action 42. Following the receipt of the acknowledgement message that confirms that the MSC 12 has received the message, the MC 22 may delete the periodic broadcast SMS message from its memory (action not shown) if all MSCs receiving the request are to perform the broadcast on their own. However, in many instances, even if the MSC 12 is meant to further distribute the periodic broadcast SMS message to MS subscribers on its own, the MSC may still not be capable to perform action 40 at the requested time, such as for example immediately upon receipt of message 38, i.e. to record the SMS message, and/or may not be able for further transmitting the periodic broadcast SMS message according to the request, which may result in delays in the distribution of the SMS message, action 45. For example, in some circumstances encountered in cellular service peak hours when the MSC's resources are fully utilized it is disadvantageous to have additional tasks given to the MSC. In such a situation, when a periodic broadcast SMS request is to be handled by the MSC, the request may be put in a queue and wait for a certain period of time before being processed. This may delay the delivery of the broadcast SMS message. Furthermore, it may also impact the load on the MSC's processing resources and therefore degrade the quality of other tasks performed by the MSC, such as the regular traffic.

Referring now to FIG. 2.*b*, there is shown a nodal operation and signal flow diagram showing yet another problematic scenario according to the prior art implementation (second scenario). Once the MC 22 is fed with the periodic broadcast SMS, action 36, the SMS request is recorded in the MC 22, action 41, and a regular broadcast SMS request is periodically sent, actions 43, 44 and 47, from the MC 22 to the MSC 12 according to the requested repetition rate of the message. In this case, the MSC 12 does no longer have to record the message for the sake of the broadcast and perform the periodic broadcast on its own. Rather, it is the MC 22 that periodically sends the message to the MSC 12, actions 43, 44 and 47, which simply forwards the message to the intended recipients (regular broadcast SMS, actions not shown) upon receipt of the messages 43, 44, and 47. Although this second scenario requires less resources to be utilized at the MSC 12, it implies that the MC 22 must store the periodic broadcast SMS message for long periods of time until the expiration of the broadcast period, and periodically send each broadcast SMS request to the appropriate MSC, thus tremendously increasing the traffic between the MC 22 and the co-operating MSCs.

Those skilled in the art will recognize that neither one of the above-mentioned prior art techniques offers an adaptive and reliable solution for handling periodic broadcast SMS delivery.

Reference is now made to FIG. 3.*a*, in which there is shown a flowchart of an exemplary preferred embodiment of the present invention that overcomes all the above-mentioned deficiencies of the prior art. As described beforehand, it is expected that the first scenario, in which cellular operators will assign the responsibility for distributing the periodic broadcast SMS messages to the MSCs, will become predominant. The present invention proposes a method and system for adaptively handling a periodic broadcast SMS request received by an MSC.

According to one of the preferred embodiments of the invention, first, a periodic broadcast SMS request is composed, action 50, by an originator, such as for example a commercial entity administrator or an MC administrator. As it will be readily apparent for those skilled in the art, the periodic broadcast SMS request may have different formats depending on the protocol utilized in the cellular telecommunications network 10. For example, the periodic broadcast SMS request may be an SMDPP message in an ANSI-41 cellular telecommunication network, and may comprise, as shown in FIG. 3.b:

a text message body 49;

a periodicity parameter 51 comprising a start time 53 (including a date), a duration 55 and a repetition rate 57 of the broadcast;

a destination identifier 59 defining a target audience, such as a broadcast zone identifier designating a zone over which the broadcast is to be performed, a target group identifier of a group of MSs, or a combination of a broadcast zone identifier and a target group of MSs.

Those skilled in the art would readily notice that the structure of the periodic broadcast SMS depends upon the communication protocol used in a given cellular telecommunications network, and that therefore various implementations are possible. Thus, FIG. 3.b should be interpreted as being merely an example of a possible structure of a periodic broadcast SMS request, whereas other and/or different parameters may exist.

Reference is now made back to FIG. 3.a. The periodic broadcast SMS request is sent or fed to the MC 22, action 52. Upon receipt of the periodic broadcast SMS request, the MC 22 processes the message and may re-map the destination identifier into identifications of the destination MSC(s) and/or of the destination cells, action 54. For example, if the periodic broadcast SMS request comprises a broadcast zone identifier designating a geographical zone over which the broadcast is to be performed, the MC 22 re-maps the geographical information into MSC's identifications. Then, the MC 22 sends the periodic broadcast SMS request to the MSC 12, action 56, which is considered the intended destination MSC for the present example. Upon receipt of the periodic broadcast SMS request, the MSC 12 processes the received periodic broadcast SMS request, action 58. In particular, the MSC 12 detects its own capabilities, such as for example its level of utilized resources (CPU usage, memory usage, running processes, number of simultaneous calls, a combination thereof, etc), or other factors that may influence the decision of whether or not accepting to handle the periodic broadcast SMS. Based on at least one of the preceding factors, the MSC 12 issues a decision on its current capability to handle the requested periodic broadcast SMS. This embodiment is better shown in FIG. 4.b, which is a simplified flowchart of the method used by the MSC in order to determine if it will, or will not, handle the periodic broadcast SMS on its own. In FIG. 4.b, at step 81, the MSC detects its current load, such as for example the current percentage of processor usage, the current memory usage, the current number of running processes, the current number of simultaneous calls, or any other factor for measuring the load on the MSC's resources. At least one of these factors, or a combination of these factors is then compared, action 83, with a pre-determined threshold in order to determine if the MSC is to accept to handle the periodic broadcast SMS on its own. Depending upon the result of the comparison of step 83, the actual decision is taken in step 85, i.e. if the current load on the MSC's resources is below the threshold then the MSC accepts to handle the request on its own, while if not, it rejects the periodic broadcast SMS request.

Reference is now made back to FIG. 3.a, wherein in action 60, the MSC 12 replies back to the MC 22 with an indication reporting its decision, i.e. the current capability to handle the requested periodic broadcast SMS. The MC 22 receives and processes the MSC's reply, action 62. In case the indication specifies that the MSC is capable of handling the periodic broadcast SMS on its own, the MC 22 may simply delete the original periodic broadcast SMS from its memory (if no other MSCs require the message to be sent to), while if the indication specifies that the MSC 12 cannot handle the periodic broadcast SMS on its own, the MC 22 keeps the periodic broadcast SMS request in a memory, and periodically sends a corresponding regular broadcast SMS request to the MSC 12, according to the periodicity parameter, the request also comprising an instruction for the MSC 12 to broadcast the message to destination upon receipt. For example, in this later scenario wherein the MC 22 must periodically send the message to the MSC 12, the MC 22 sends a regular broadcast SMS request to the MSC 12, at regular intervals. Upon receipt of the regular broadcast SMS request, the MSC 12 delivers the SMS body message to destination, thus reducing the load on the MSC's resources.

Additionally, upon receipt of the MSC's reply of action 60, the MC 22 may also update a list 61 of MSCs' capabilities (shown on FIG. 1), in action 62, in order to keep track of the particular MSC's capability to handle the periodic broadcast SMS. This list 61 may include the capability of the particular MSC along with the date and time of the reply. Based on this update, the MC 20 may adjust its subsequent periodic broadcast SMS requests accordingly, during a pre-determined period of time after the reply 60. For example if the MC 12 is notified in the reply 60 that the MSC 12 cannot handle a first periodic broadcast SMS request on its own, and shortly after a second periodic broadcast SMS is to be sent to the same MSC 12, the MC 22 will consult its list and notice that the MSC 12 is not currently able to handle a periodic broadcast SMS request, and then decide to rather send regular broadcast requests, as described beforehand.

Reference is now made to FIG. 4.a, which illustrates a preferred embodiment of the present invention by way of an exemplary nodal operation and signal flow diagram wherein a periodic broadcast SMS is to be delivered to the MSC 12 (for further broadcast to the destination MSs), in which the MSC 12 accepts to handle the periodic broadcast SMS message on its own. First, in action 50, a periodic broadcast SMS request is composed by an SMS Originator 30 according to techniques well known in the art. Then, the periodic broadcast SMS request is sent to the MC 22, action 52. In ANSI-41 standard, which is the North-American standard for cellular telephony, incorporated herein by reference, such a periodic broadcast SMS request may be made through a Short Message Delivery Point-to-Point (SMDPP) message. In action 54, the MC 22 processes the request and re-maps the destination identifier from the request message into the destination MSC(s) identity, and based on this information, forwards the periodic broadcast SMS request (SMDPP message in ANSI-41 networks) to the MSC 12, action 56. Upon receipt of the periodic broadcast SMS message, the MSC 12 identifies that it is a request for periodic broadcast SMS message and detects its own capability of handling the periodic broadcast SMS based on internal parameters, action 58, as shown in FIG. 4.b and as described hereinbefore. Assuming the decision is positive, i.e. the MSC 12 currently has the required extra resources capacity to handle the current periodic broadcast SMS request on its own, the MSC 12 records the periodic broadcast SMS message, action 59, and sends an indication 90 of its capability of handling the periodic broadcast SMS to the MC 22, in action 60. According to the invention, in an ANSI-41 network, it is proposed to include the indication relating to the capability of the MSC 12 to handle on its own the periodic broadcast SMS in the smdpp acknowledgement message sent from the MSC 12 to the MC 22, following the receipt of the SMDPP message by the MSC 12. As it will be readily apparent for those skilled in the art, various approaches are possible for including the indication 90 of the MSC's capability to handle the periodic broadcast SMS request in the smdpp acknowledgement message, such as for example including it in a parameter of the message, or in a value of a parameter of the message.

Upon receipt of the reply 60 (smdpp acknowledgement message in ANSI-41 networks), the MC 22 processes the reply, action 62'. The periodic broadcast SMS (original SMDPP received in action 52 in ANSI-41 networks) may be deleted from the MC 22 in case no other MSCs need to receive it; alternatively and preferably, the MC 12 may keep track in its memory that the MSC 12 has accepted to handle the periodic broadcast SMS and that no further assistance is required. The MC 22 may also update its internal list 61 (shown in FIG. 1) with the MSC 12 current capability of handling periodic broadcast SMS requests on its own so that subsequent requests for periodic broadcast SMS may be further delivered to the MSC 12 (known now to have available resources for handling periodic broadcast SMS requests for a period of time). Thereafter, the MSC 12 periodically broadcasts the message body of the periodic broadcast SMS request, actions 63, 65 and 67, toward the defined destination according to the start time 53, broadcast duration 55 and repetition rate (•t) 57.

Figure 5:
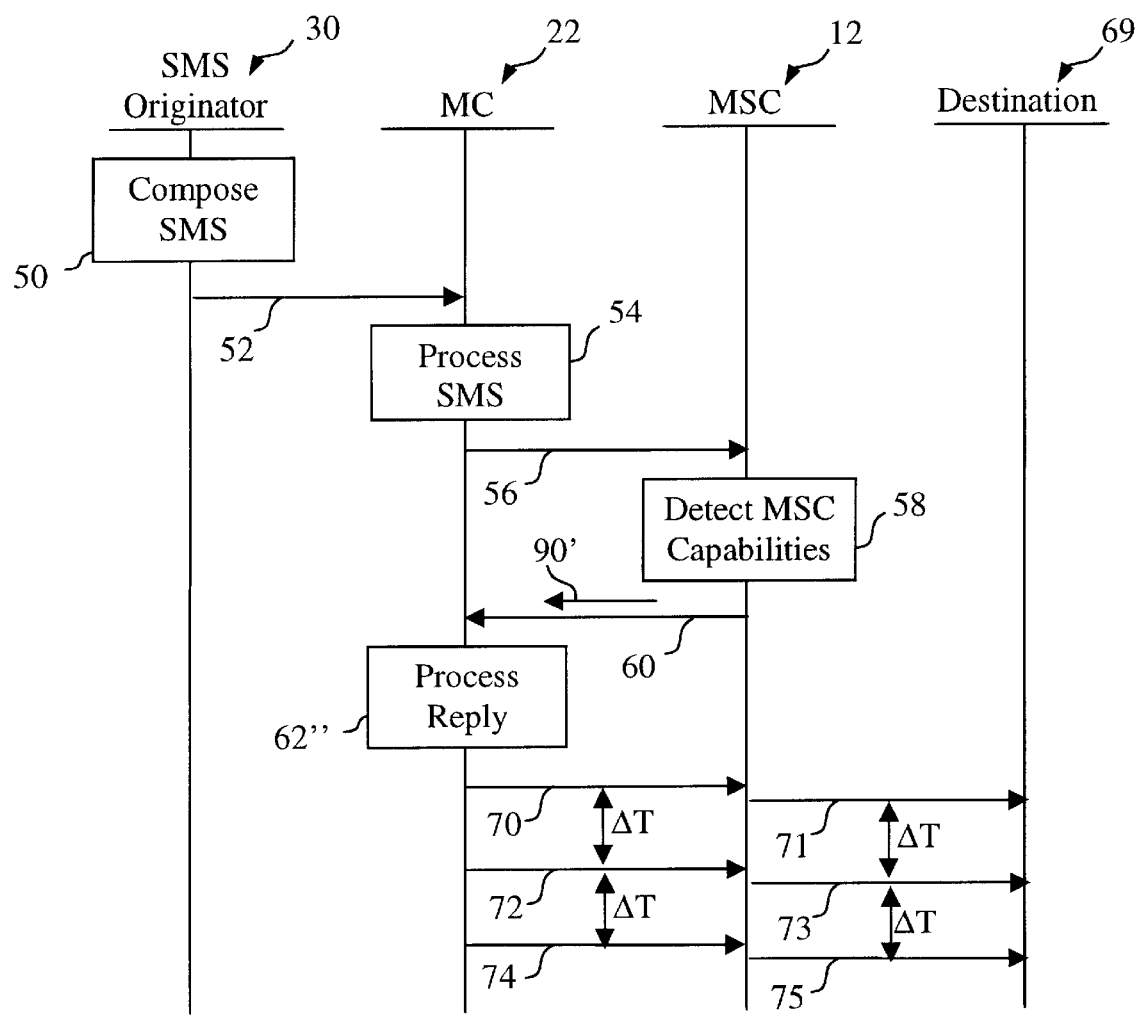
FIG. 5 is a nodal operation and signal flow diagram illustrating yet another exemplary preferred embodiment of the invention.

Reference is now made to FIG. 5, which illustrates the preferred embodiment of the present invention by way of another exemplary scenario wherein a periodic broadcast SMS is to be delivered to the MSC 12 (for further broadcast to the Destination MSs 69), the MSC 12 being currently unable to handle the periodic broadcast SMS message on its own, therefore requiring the assistance of the MC 22. First, in action 50, a periodic broadcast SMS request is composed by an originator, and the periodic broadcast SMS request is sent to the MC 22, action 52 as also described in FIG. 4. In action 54, the MC 22 processes the request and extracts the destination MSC identity from the request message, and based on this information, forwards the periodic broadcast SMS request (SMDPP message in ANSI-41 networks) to the MSC 12, action 56. Upon receipt of the periodic broadcast SMS request, the MSC 12 identifies that it is a request for periodic broadcast SMS message and detects its capability of handling the periodic broadcast SMS request based on internal parameters, action 58, as described hereinbefore for FIG. 4.*b*. A decision is taken whether or not the MSC 12 is to support the periodic broadcast SMS on it own. Assuming the decision is negative, i.e. the MSC does not have the current resources capacity to handle the periodic broadcast SMS on its own, the MSC 12 reports back to the MC 22 an indication 90' of its incapacity of handling the periodic broadcast SMS, in action 60. According to the invention, and as described beforehand, in an ANSI-41 network it is proposed to include the indication 90' relating to the capability of the MSC 12 to handle on its own the periodic broadcast SMS in the smdpp acknowledgement message sent from the MSC 12 to the MC 22 for confirming the receipt of the original SMDPP request (received by the MSC 12 in action 56). As also described beforehand, those skilled in the art will notice that the indication 90' may be inserted at various positions within the smdpp acknowledgment message. Upon receipt of the reply (smdpp acknowledgement message in ANSI-41 networks), the MC 22 processes the reply, action 62", and detects that the MSC 12 cannot handle the periodic broadcast SMS on its own. In such cases, the MC 22 keeps the periodic broadcast SMS request in its memory and handles the broadcast on its own. Optionally, the MC 22 may also update its internal list 61 (shown in FIG. 1) with the MSC 12 current capability of handling periodic broadcast SMS requests on its own. For example, given the fact that the MSC 12 is now known to be in a shortage of resources, and assuming this situation may last for some time (for a pre-defined period of time), then the MC 12 will not send any further requests for periodic broadcast SMS to the MSC 12 for the length of the pre-defined period of time. Rather, upon receipt of a periodic broadcast SMS request, the MC 12 will handle the periodicity of the request on its own, thus avoiding to request further processing resources from the MSC 12, by sending regular broadcast SMS requests to the MSC 12 (known to be less demanding in MSC's processing resources compared to a periodic broadcast SMS request), at regular intervals of time.

Therefore, after processing the reply, action 62", the MC 22 periodically sends the regular broadcast SMS request, actions 70, 72 and 74, to the MSC 12, along with an instruction for forwarding to the intended recipients (Destination 69). Upon receipt of each one of the requests 70, 72, and 74, the MSC 12 processes the regular broadcast SMS request and forwards the message body to the intended recipients (Destination 69), actions 71, 73, and 75. It is believed that this method of periodic broadcast SMS, in which the MSC 12 merely forwards the broadcast SMS message, and wherein the periodicity of the broadcast is supported by the MC 22, greatly reduces the charge on the MSC's resources.

Figure 6:
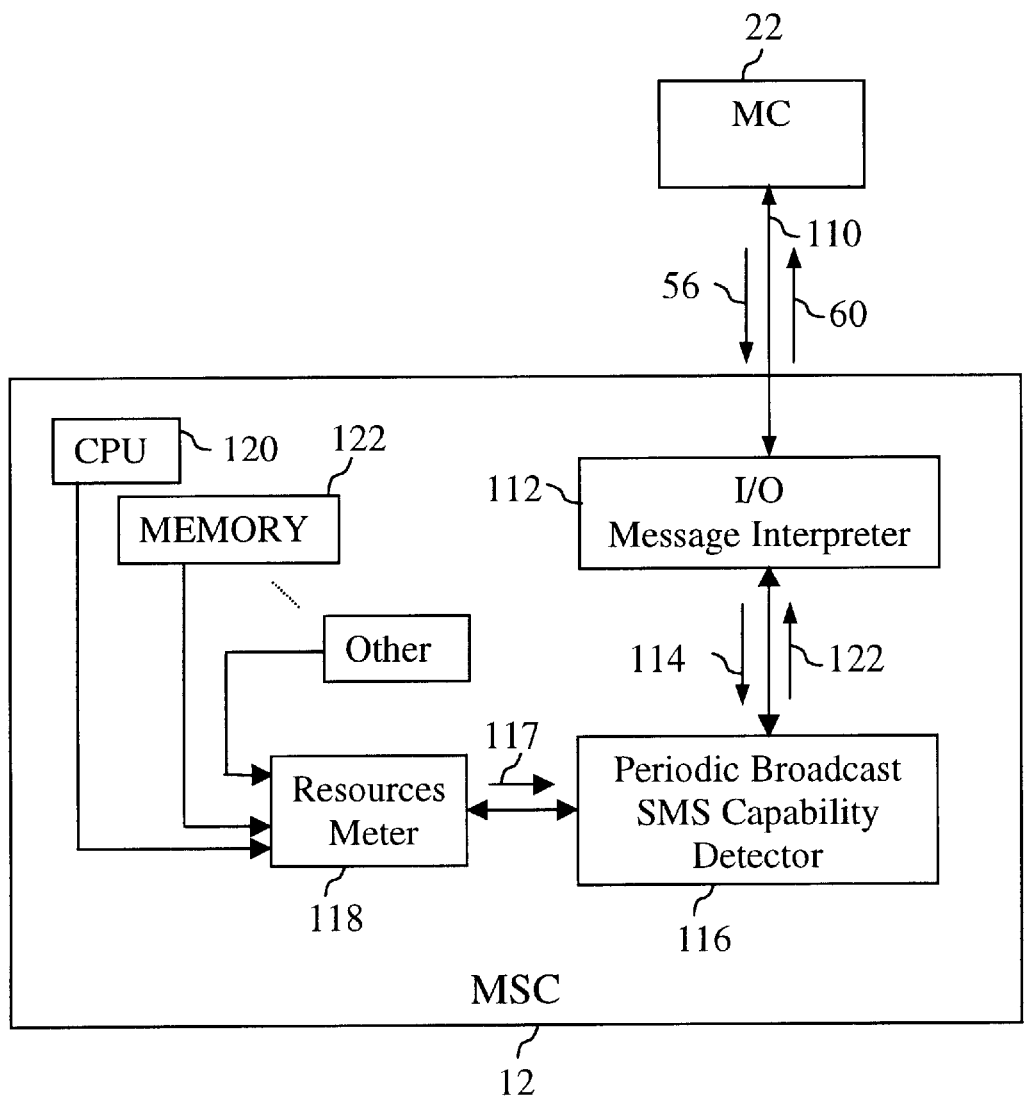
FIG. 6 is a high level block diagram of an exemplary implementation of one aspect of the preferred embodiment of the invention within an MSC.

Reference is now made to FIG. 6 which is an exemplary high level block diagram of an MSC 12 incorporating one of the preferred embodiment of the invention directed to the actual implementation within the MSC. As described hereinbefore, the MSC 12 is linked to the MC 22 through a link 110, and receives a periodic broadcast SMS request (SMDPP message in ANSI-41 networks), action 56, from the MC 22. The request may be received in the MSC 12 by an Input/Output (I/O) Message Interpreter 112, which detects that the received message is a periodic broadcast SMS request. According to the invention, the I/O message Interpreter 112 may then send a message 114 for inquiring whether or not the MSC should accept to handle the periodic broadcast SMS request on its own. In turn, the Capability detector 116 requests and receives a level 117 of the current load on the MSC's resources from a Resource Meter 118, which is responsible for gathering information from a number of MSC's resources, such as for example from the Central Processing Unit (CPU or processor) 120, from the MSC's memory (RAM) 122, or from any other device within the MSC 12 that may provide meaningful information about the level of resources usage. As stated hereinbefore, the measured resources may be the processor usage, the memory usage, the simultaneous number of calls being handled or any other indication of utilized MSC's resources. Furthermore, the level of the current load may be expressed in terms of percentage, or in absolute number value, such as for example as a number of current calls being handled by the MSC 12, as the number of memory blocks utilized, etc. Those skilled in the art will notice that various techniques and/or combinations of parameters are possible for stating the level of utilized resources in an MSC.

Once the capability Detector 116 receives the level of utilized resources 117, which may be a parameter representative of one or more types of utilized resources, it performs a comparison between said level (or parameter) 117 and a pre-defined threshold. If the level of utilized resources (or representative parameter) is lower than the pre-defined threshold, then it is concluded that there are still available resources in the MSC 12 to accept handling the request for periodic broadcast SMS. If not, it is deduced that accepting to handle the periodic broadcast SMS will degrade the MSC performance and/or will delay the processing of the request, and therefore the request should be rejected. Based on at least one of the described factors, a decision 122 is issued (whether or not to handle the request for periodic broadcast SMS) by the Capability Detector 116 and sent back to the I/O Message Interpreter 112, which in turn forms a periodic broadcast SMS acknowledgement message 60 (an smdpp acknowledgement message in ANSI-41 networks), the message 60 including an indication of the MSC capability to handle the periodic broadcast SMS request on its own. The periodic broadcast SMS acknowledgement message is transmitted back to the MC 12, which in turn processes the message and acts in response in a manner described hereinbefore.

As it will be readily apparent for those skilled in the art, the actual implementation of the invention in the MSC 12 may take various forms without departing from the spirit of the invention. Preferably, the Message Interpreter 112, the Periodic Broadcast SMS Capability Detector 116, and the Resources Meter 118 are all software modules in virtual interaction with each other implemented and running on the MSC software platform. Alternatively, the mentioned functions may be implemented into a single software module, into different electronic modules or into one or more electronics modules.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a cellular telecommunications network, a method for periodic broadcast Short Message Service (SMS) comprising the steps of:
   sending a request for a periodic broadcast SMS message from a Message Center (MC) to at least one Mobile Switching Center (MSC);
   upon receipt of said request by said MSC, detecting a capability of said MSC to handle periodic broadcast SMS messages; and
   returning, from said MSC to said MC, an indication of said capability of said MSC to handle periodic broadcast SMS messages.

2. The method as claimed in claim 1 further comprising the step of:
   processing said indication received from the MSC by the MC.

3. The method claimed in claim 2, where in the step of processing comprises updating a list of current MSCs' capabilities using said indication of said capability of said MSC to handle periodic broadcast SMS, upon receipt of said indication at the MC.

4. The method claimed in claim 2,
   wherein the step of processing comprises the steps of:
     detecting that said MSC is capable of handling periodic SMS broadcast messages; and
     keeping in a memory of said MC an information related to said capability of said MSC;
   and further comprising the step of:
     periodically sending a message body of said periodic broadcast SMS request from said MSC to a plurality of destination MSs currently located within a service area of said MSC.

5. The method claimed in claim 2
   wherein the step of processing comprises the steps of:
     detecting that said MSC is not capable of handling periodic SMS broadcast messages; and
     keeping said request for a periodic broadcast SMS message in a memory of the MC;
   and further comprising the steps of:
     periodically sending a request for regular broadcast SMS message from said MC to said MSC; and
     upon receipt of said request for regular broadcast SMS by said MSC, sending a message body of said request for regular broadcast SMS to a plurality of MSs currently located within a service area of said MSC.

6. The method claimed in claim 1, wherein at least a portion of said cellular telecommunications network is an ANSI-41 cellular telecommunications network.

7. The method claimed in claim 6, wherein:
   said request for periodic broadcast SMS message is a Short Message Delivery Point-to-Point (SMDPP) message; and
   said capability indication is comprised in an smdpp acknowledgement message sent from said MSC to said MC.

8. The method claimed in claim 1, further comprising prior to the step of sending a request, the step of:
   creating said request for periodic broadcast SMS message by an SMS originator; and
   sending said request for periodic broadcast SMS message to the MC.

9. In an ANSI-41 cellular telecommunications network, a method for periodically broadcasting Short Message Service (SMS) messages comprising the steps of:
   sending a request for periodic broadcast Short Message service (SMS) through a Short Message Delivery Point-to-Point (SMDPP) message from an SMS originator to a Message Center (MC) for requesting a periodic broadcast SMS, said SMDPP message comprising:
     a message body to be broadcast to a plurality of MSs;
     a periodicity parameter comprising a start time, a duration and a repetition rate of said periodic broadcast SMS message; and
     a destination identifier comprising at least one of i) a geographical zone identifier designating a zone over which the message is to be broadcast and ii) a subscribers' group identifier designating a group of subscribers' MSs intended to receive said SMS message;
   sending said SMDPP message from said MC to at least one Mobile Switching Center (MSC) covering at least a portion of said zone; and
   returning, from said at least one MSC to said MC, an smdpp acknowledgement message comprising an indication of an individual capability of said at least one MSC to handle on its own the periodic broadcast SMS;

wherein if said MSC is capable of handling said periodic broadcast SMS, said indication is an empty smdpp acknowledgement message, while if said MSC is not capable of handling the periodic SMS broadcast, the indication is comprised in one parameter of said smdpp acknowledgement message.

10. The method claimed in claim 9, further comprising the step of:

upon receipt of said smdpp acknowledgement message from each MSC, recording in the MC the individual capability of said at least one MSC to handle periodic broadcast SMS on its own.

11. The method claimed in claim 9, subsequently comprising the steps of:

periodically sending a request for regular broadcast SMS using an SMDPP message comprising no periodicity parameter from said MC to each MSC not capable of handling said periodic broadcast SMS; and upon receipt of said request for regular broadcast SMS message at said each MSC, extracting said message body from said SMDPP message and forwarding said message body from said each MSC to a plurality of MSs located within said zone.

12. A cellular telecommunications network comprising:

a Message Center (MC) sending a request for a periodic broadcast Short Message Service (SMS) message; and at least one Mobile Switching Center (MSC) linked to said MC, receiving said request from said MC;

wherein upon receipt of said request, said MSC detects its capability of handling periodic broadcast SMS messages on its own and replies back to the MC with an indication of said capability.

13. The cellular telecommunications network as claimed in claim 12, wherein at least a portion of said network is an ANSI-41 cellular telecommunications network;

said request is an ANSI-41 Short Message Service Delivery point-to-Point (SMDPP) message; and said indication is comprised in an ANSI-41 smdpp acknowledgement message.

14. The cellular telecommunications network as claimed in claim 12, wherein the MC comprises an MSCs' capabilities list for storing said indication of said capability of said MSC to handle periodic broadcast SMS messages, said MC updating said list upon receipt of said indication from said MSC.

15. The cellular telecommunications network claimed in claim 12, wherein:

if said indication signifies that said MSC is capable of handling periodic broadcast SMS messages on its own:

said MC keeps in a memory said indication that said MSC is capable of handling periodic broadcast SMS messages; and said MSC periodically broadcasts a message body of said request according to a start time, a duration, and a repetition rate of said request over a broadcast zone;

if said indication signifies that said MSC is not capable of handling periodic SMS broadcast messages on its own:

the MC periodically transmits a request for a regular broadcast SMS message to said MSC; and upon receipt of said request, the MSC extracts said message body from said request for regular broadcast SMS and broadcasts said message body over said broadcast zone.

16. In a cellular telecommunications network, a Mobile Switching Center (MSC) for receiving a request for a periodic broadcast Short Message Service (SMS) through a Short Message Service Delivery Point-to-Point (SMDPP) message from a Message Center (MC), wherein upon receipt of said request the MSC is capable of detecting its capability of handling said request based on a current load on its processing resources, and further capable of replying back to the MC with an smdpp acknowledgement message comprising an indication of its capability of handling said request on its own.

17. The MSC as claimed in claim 16, wherein for detecting said capability of handling said request, the MSC detects the current load on its resources by using at least one parameter selected from the group consisting of the processor usage, the memory usage and the current number of calls;

compares said current load with a pre-defined threshold; and depending upon a result of the comparison, decides whether or not to handle said request on its own.

18. The MSC claimed in claim 16, wherein if said MSC is capable of handling said request on its own, said MSC records said request, and periodically sends a message body of said request to a plurality of destination Mobile Stations (MSs).

19. The MSC claimed in claim 16, wherein if said MSC is not capable of handling said request on its own, said MSC periodically receives a request for a regular broadcast SMS from said MC, and upon receipt of each of said request for a regular broadcast SMS, extracts a message body from said request and sends said message body of said request to a plurality of destination Mobile Stations (MSs).

20. A Mobile Switching Center (MSC) comprising:

a resources meter for collecting at least one parameter representative of a level of utilized resources of said MSC; and a periodic broadcast SMS capability detector for receiving said at least one parameter from said resources meter and for comparing said parameter with a pre-defined threshold of utilized resources;

wherein said detector issues a decision based on a result of the comparison, the decision stating whether or not said MSC is to handle a periodic broadcast SMS request on its own.

21. The MSC claimed in claim 20, wherein said level of utilized resources is calculated using at least one parameter from the set consisting of the processor usage, the memory usage and the number of simultaneous calls.

22. The MSC claimed in claim 20, further comprising an I/O Message Interpreter for receiving a periodic broadcast SMS request from a Message Center;

sending a request for a level of utilized resources to the periodic broadcast SMS capability detector;

receiving said level from said detector; and sending back to the MC an indication of the capability of said MSC to handle said periodic broadcast SMS on its own.

\* \* \* \* \*